(12) United States Patent
Pruysen et al.

(10) Patent No.: US 8,229,695 B2
(45) Date of Patent: Jul. 24, 2012

(54) METER ELECTRONICS AND METHODS FOR GEOMETRIC THERMAL COMPENSATION IN A FLOW METER

(75) Inventors: Aart R Pruysen, Ede (NL); Jacob Andreas Sinte Maartensdijk, Veenendaal (NL); Robert Barclay Garnett, Arvada, CO (US)

(73) Assignee: Micro Motion, Inc., Boulder, CO (US)

( * ) Notice: Subject to any disclaimer, the term of this patent is extended or adjusted under 35 U.S.C. 154(b) by 560 days.

(21) Appl. No.: 12/441,118

(22) PCT Filed: Sep. 28, 2006

(86) PCT No.: PCT/US2006/038423
§ 371 (c)(1),
(2), (4) Date: Mar. 12, 2009

(87) PCT Pub. No.: WO2008/039203
PCT Pub. Date: Apr. 3, 2008

(65) Prior Publication Data
US 2009/0312977 A1      Dec. 17, 2009

(51) Int. Cl.
*G01F 1/50* (2006.01)
*G06F 17/40* (2006.01)

(52) U.S. Cl. ............ 702/100; 702/99; 702/136; 702/45; 702/48; 73/861.01

(58) Field of Classification Search .............. 702/100, 702/45, 48, 50, 99, 130, 136, 137
See application file for complete search history.

(56) References Cited

U.S. PATENT DOCUMENTS

| | | | |
|---|---|---|---|
| 5,687,100 A * | 11/1997 | Buttler et al. | 702/137 |
| 5,861,546 A | 1/1999 | Sagi et al. | |
| 6,182,019 B1 | 1/2001 | Wiklund | |
| 6,327,915 B1 | 12/2001 | Van Cleve et al. | |
| 7,614,273 B2 * | 11/2009 | Patten et al. | 73/1.16 |
| 2009/0165567 A1 * | 7/2009 | Tombs | 73/861.355 |

FOREIGN PATENT DOCUMENTS
WO    WO-01/71290 A1    9/2001

* cited by examiner

*Primary Examiner* — Hal Wachsman
(74) *Attorney, Agent, or Firm* — The Ollila Law Group LLC (57) ABSTRACT

Meter electronics for geometric thermal compensation in a flow meter is provided according to the invention. The meter electronics includes an interface configured to receive sensor signals and a temperature signal (T) of the flow meter. The meter electronics further includes a processing system coupled with the interface and configured to receive the sensor signals and the temperature signal (T) and compute a geometric thermal compensation factor (TFe) for one or more flow conduits of the flow meter using the temperature signal (T). The geometric thermal compensation factor (TFe) is used to process the first and second sensor signals.

35 Claims, 3 Drawing Sheets

METER ELECTRONICS AND METHODS FOR GEOMETRIC THERMAL COMPENSATION IN A FLOW METER

BACKGROUND OF THE INVENTION

1. Field of the Invention

The present invention relates to a flow meter, and more particularly, to meter electronics and methods for geometric thermal compensation in a flow meter.

2. Statement of the Problem

Vibrating conduit sensors, such as Coriolis flow meters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis flow meter includes one or more flow conduits or flow tubes that are connected inline in a pipeline or other transport system and convey material, e.g., fluids, slurries and the like, in the system. Each conduit may be viewed as having a set of natural vibration modes including, for example, simple bending, torsional, radial, and coupled modes. In a typical Coriolis flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling, such as two independent pairs of wires. The instrumentation receives signals from the two pickoff sensors and processes the signals in order to derive a mass flow rate measurement.

For a set of conditions of the flow meter, (e.g., for a particular temperature, mount, external loads, etc.) the mass flow rate is linearly proportional to the time delay ($\Delta t$) between the pickoff sensors. This relationship is given in equation 1 below.

$$\dot{m} = FCF \cdot (\Delta t - zero) \tag{1}$$

The FCF term is a proportionality constant and is commonly referred to as the flow calibration factor. The zero value is an empirically derived zero flow offset.

The FCF is primarily dependent upon the stiffness and the geometry of the flow conduits of the flow meter. The geometry includes features such as the locations where the two phase or time measurements are made. The stiffness is dependent on the flow conduit's material properties as well as on the geometry of the conduits. For a particular flow meter, the FCF value and the zero value are found through a calibration process performed with a calibration fluid flowing at two known mass flow rates and at a specific calibration temperature.

If the stiffness or geometry of the flow meter changes during operation, after the time of initial calibration, then the FCF will also change. For example, an increase in the operating temperature to a level above the calibration temperature may result in a change in the stiffness of the flow meter. To ensure accurate mass flow measurement requires that the FCF value and the zero value remain nearly constant. This may be very difficult to achieve. Alternatively, an accurate mass flow measurement requires that a robust method of accounting for changes in the FCF and/or zero values is employed.

The prior art flow meter is typically calibrated at a specific reference temperature ($T_0$). However, in use the flow meter is often operated at temperatures that are different than the reference temperature.

In the prior art, a flow meter is compensated for changes in temperature in a relatively simple manner. It is known in the prior art that the modulus of elasticity changes with temperature. As a result, in the prior art the mass flow and density equations have been augmented to account for this effect on the modulus of elasticity.

The typical form of the prior art mass flow equation, including temperature compensation for the modulus of elasticity (E) or Young's modulus, is given in equation 2 below.

$$\dot{m} = FCF \cdot (1 - \phi \cdot \Delta T) \cdot (\Delta t - zero) \tag{2}$$

The Young's modulus term $(1 - \phi \cdot \Delta T)$ defines how the FCF changes corresponding to a change in flowmeter temperature from the reference temperature ($T_0$).

The slope of the above function, $\phi$, often referred to as FT, is typically determined through experimentation for a particular flow meter design or flow meter family. In the prior art, it is commonly believed that FT is essentially the same as the slope of the modulus of elasticity with temperature.

However, the modulus of elasticity is not always linear over the full range of temperatures which a flow meter is operated. To account for this non-linearity, higher order polynomials have been employed to better compensate for this change, such as equation 3 below.

$$\dot{m} = FCF(1 - \phi_1 \cdot \Delta T - \phi_2 \cdot \Delta T^2 - \phi_3 \cdot \Delta T^3 - \phi_4 \cdot \Delta T^4) \cdot (\Delta t - zero) \tag{3}$$

The higher order polynomial $(1 - \phi_1 \cdot \Delta T - \phi_2 \cdot \Delta T^2 \ldots)$ term defines how the FCF changes with a change in flowmeter temperature. The Young's modulus term is represented as TFy. The (TFy) term can comprise a first order linear term or can comprise a polynomial.

A Coriolis flow meter can also measure the density ($\rho_f$) of a process fluid within the vibrating frame of reference. The period of vibration, squared, is linearly proportional to the mass of the vibrating system divided by its stiffness. For a particular condition of the flow conduits, the stiffness and mass are constant and the fluid density ($\rho_f$) is linearly proportional to the period squared. This relationship is given in equation 4 below.

$$\rho_f = C_1 \cdot K^2 - C_2 \tag{4}$$

The $C_1$ term is a proportionality constant and the $C_2$ term is an offset. The coefficients $C_1$ and $C_2$ are dependent on the stiffness of the flow conduits and on the mass and the volume of fluid within the flow meter. The coefficients $C_1$ and $C_2$ are determined by calibrating the flow meter using two fluids of known density.

In the prior art, the density computation has also been compensated for temperature. The typical form of the density equation, including temperature compensation for the modulus of elasticity, is given in equation 5 below.

$$\rho_f = C_1 \cdot K^2 \cdot (TF_y) - C_2 \tag{5}$$

The ($TF_y$) term defines how the tube period squared changes with a change in temperature from the reference temperature ($T_0$), as previously discussed.

The slope of the above function, φ, often referred to as DT in this equation, is typically determined through experimentation for a particular flow meter design or flow meter family. It should be noted that as in the mass flow rate, higher order functions can be used for refining the effect of temperature on the density temperature compensation process. Like FT, in the prior art it is commonly believed that DT is the same as the slope of modulus of elasticity with temperature. As a result, in the prior art, the mass flow rate and the density are temperature compensated in an identical fashion.

At about the reference (i.e., calibration) temperature, the DT and FT temperature compensation procedures function acceptably well. However, their inherent inaccuracy/incompleteness becomes noticeable and pronounced at extremes of temperature. For this reason, additional compensation/calibration processes are often necessary in the prior art. For example, for flow meters destined for use at high temperatures, such as 90 degrees C., for example, a new calibration process is performed at a similarly high reference temperature. This additional calibration process may guarantee that the flow meter operate within desired accuracy at temperatures around this new calibration temperature. However, if the ambient temperature significantly drops (or rises), the accuracy of the flowmeter is still adversely affected.

SUMMARY OF THE SOLUTION

Meter electronics for geometric thermal compensation in a flow meter is provided according to an embodiment of the invention. The meter electronics includes an interface configured to receive sensor signals and a temperature signal (T) of the flow meter. The meter electronics further comprises a processing system coupled with the interface and configured to receive the sensor signals and the temperature signal (T) and compute a geometric thermal compensation factor (TFe) for one or more flow conduits of the flow meter using the temperature signal (T). The geometric thermal compensation factor (TFe) is used to process the first and second sensor signals.

A method for geometric thermal compensation in a flow meter is provided according to an embodiment of the invention. The method comprises receiving sensor signals and a temperature signal (T) of the flow meter and computing a geometric thermal compensation factor (TFe) for one or more flow conduits of the flow meter using the temperature signal (T). The geometric thermal compensation factor (TFe) is used to process the first and second sensor signals.

A method for geometric thermal compensation in a flow meter is provided according to an embodiment of the invention. The method comprises receiving sensor signals and a temperature signal (T) of the flow meter and computing a geometric thermal compensation factor (TFe) for one or more flow conduits of the flow meter using the temperature signal (T). The method further comprises computing one or both of a thermally compensated density or a thermally compensated mass flow rate. The geometric thermal compensation factor (TFe) is used to process the first and second sensor signals.

Aspects

In one aspect of the meter electronics, the geometric thermal compensation factor (TFe) comprises a linear expression.

In another aspect of the meter electronics, the geometric thermal compensation factor (TFe) comprises a polynomial expression.

In yet another aspect of the meter electronics, the meter electronics further comprises a storage system configured to store the geometric thermal compensation factor (TFe).

In yet another aspect of the meter electronics, the meter electronics further comprises a storage system configured to store a density and a mass flow rate.

In yet another aspect of the meter electronics, the processing system is configured to compute the geometric thermal compensation factor (TFe) for the one or more flow conduits using the temperature signal (T).

In yet another aspect of the meter electronics, the geometric thermal compensation factor includes a temperature difference ($\Delta T$) between a reference temperature ($T_0$) and the temperature signal (T).

In yet another aspect of the meter electronics, the processing system is configured to compute one or more flow characteristics from the sensor signals and the geometric thermal compensation factor (TFe).

In yet another aspect of the meter electronics, the processing system is configured to compute a thermally compensated density.

In yet another aspect of the meter electronics, the processing system is configured to compute a thermally compensated density according to the equation $$\rho_f = \frac{K^2 \cdot C_1 \cdot (TF_y)}{(TF_e)^2} - \frac{C_2}{(TF_e)^3},$$

with the (TFe) term including a linear coefficient of thermal expansion ($\alpha$).

In yet another aspect of the meter electronics, the (TFy) term comprises a modulus of elasticity thermal compensation term.

In yet another aspect of the meter electronics, the processing system is configured to compute a thermally compensated mass flow rate.

In yet another aspect of the meter electronics, the processing system is configured to compute a thermally compensated mass flow rate according to the equation $\dot{m}=FCF \cdot \Delta T \cdot (TF_y) \cdot (TF_e)$, with the (TFe) term including a linear coefficient of thermal expansion ($\alpha$).

In yet another aspect of the meter electronics, the (TFy) term comprises a modulus of elasticity thermal compensation term.

In one aspect of the method, the geometric thermal compensation factor (TFe) comprises a linear expression.

In another aspect of the method, the geometric thermal compensation factor (TFe) comprises a polynomial expression.

In yet another aspect of the method, the computing further comprises computing the geometric thermal compensation factor (TFe) for the one or more flow conduits using the temperature signal (T) and a linear coefficient of thermal expansion ($\alpha$) or polynomial.

In yet another aspect of the method, the geometric thermal compensation factor (TFe) includes a temperature difference ($\Delta T$) between a reference temperature ($T_0$) and the temperature signal (T).

In yet another aspect of the method, the method further comprises computing one or more flow characteristics from the sensor signals and the geometric thermal compensation factor (TFe).

In yet another aspect of the method, the method further comprises computing a thermally compensated density.

In yet another aspect of the method, the method further comprises

In yet another aspect of the method, the method further comprises computing a thermally compensated density according to the equation $$\rho_f = \frac{K^2 \cdot C_1 \cdot (TF_y)}{(TF_e)^2} - \frac{C_2}{(TF_e)^3},$$

with the (TFe) term including a linear coefficient of thermal expansion ($\alpha$).

In yet another aspect of the method, the (TFy) term comprises a modulus of elasticity thermal compensation term.

In yet another aspect of the method, the method further comprises computing a thermally compensated mass flow rate.

In yet another aspect of the method, the method further comprises computing a thermally compensated mass flow rate according to the equation $\dot{m} = FCF \cdot \Delta T \cdot (TF_y) \div (TF_e)$, with the (TFe) term including a linear coefficient of thermal expansion ($\alpha$).

In yet another aspect of the method, the (TFy) term comprises a modulus of elasticity thermal compensation term.

DETAILED DESCRIPTION OF THE INVENTION

Figure 1:
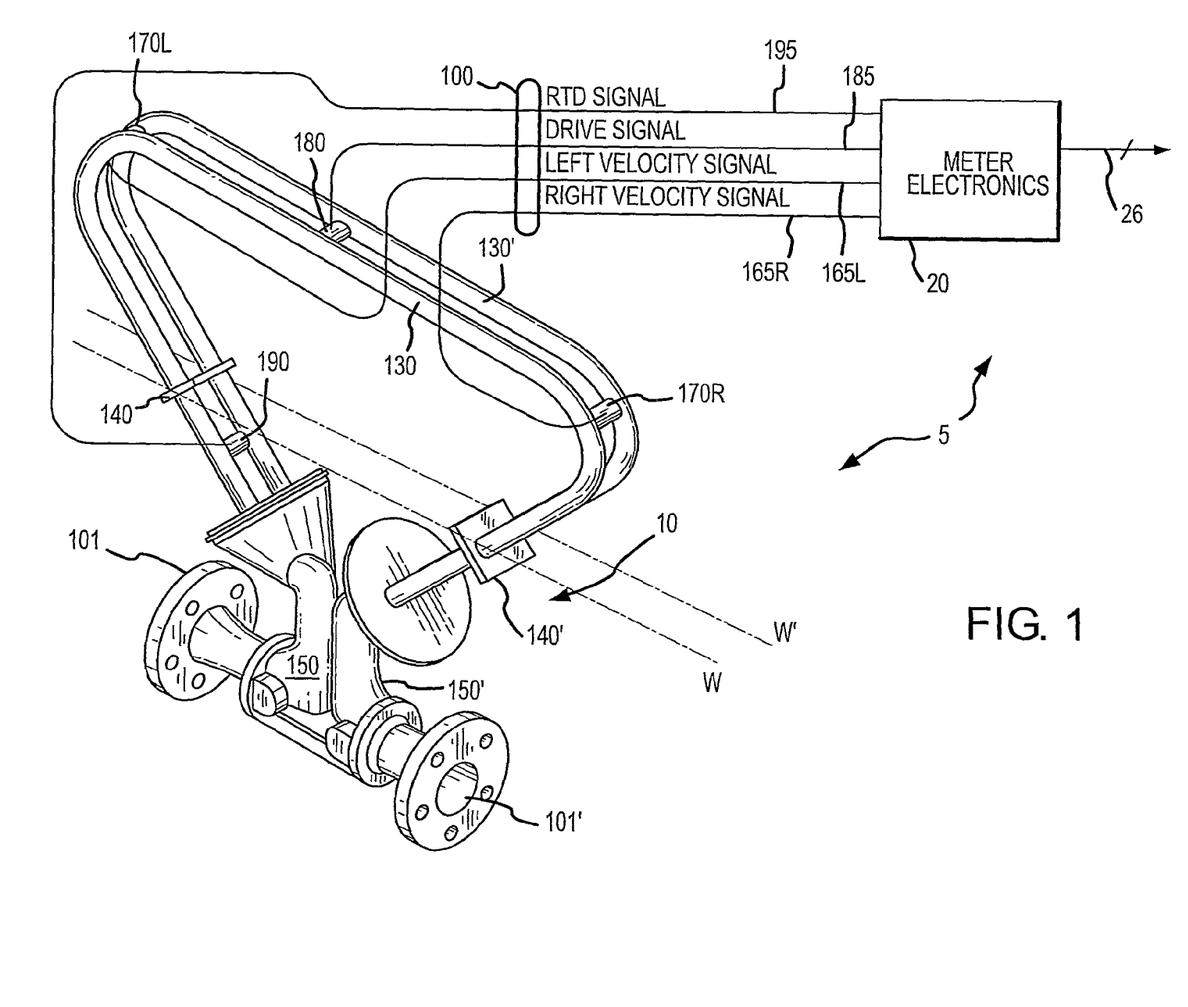
FIG. 1 illustrates a Coriolis flow meter comprising a flow meter assembly and meter electronics.
Figure 2:
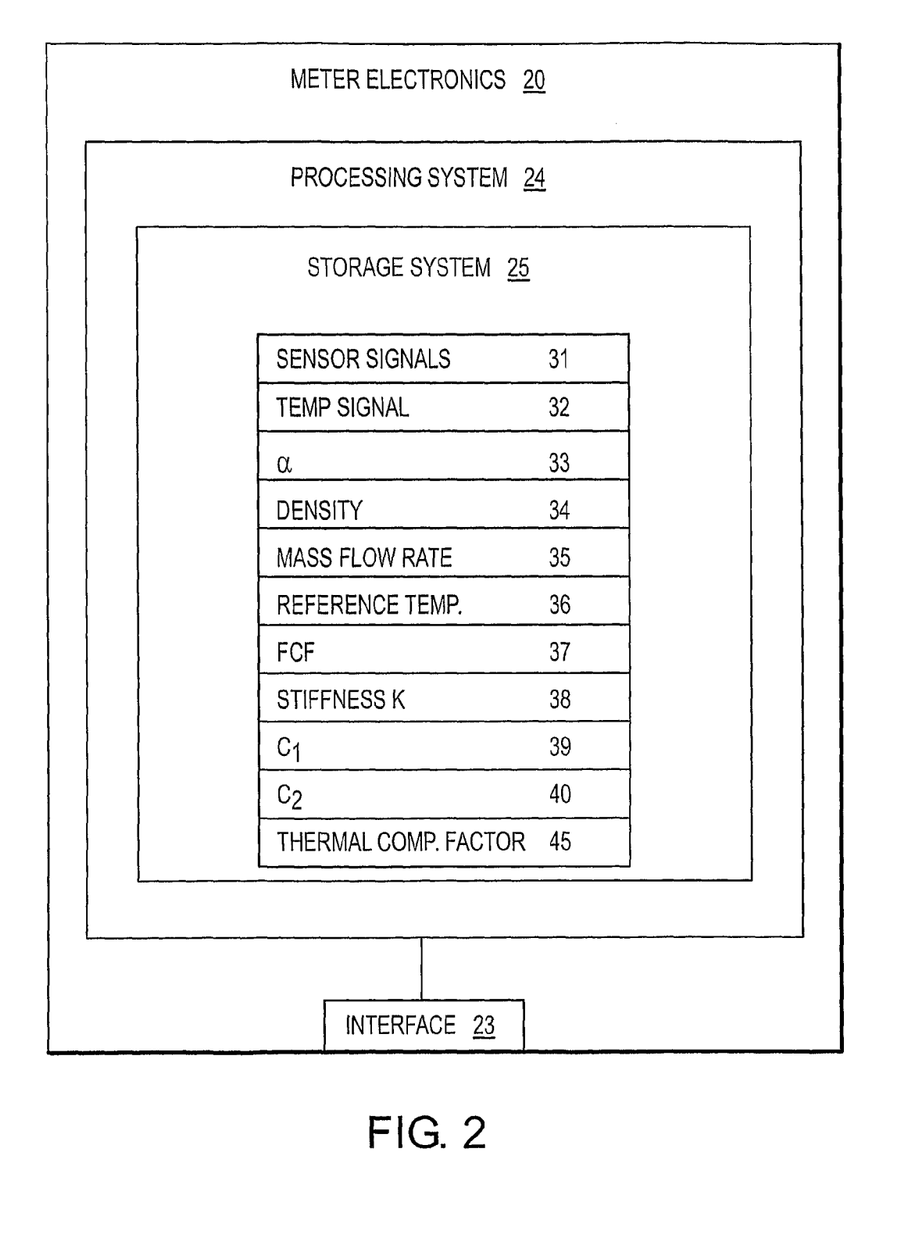
FIG. 2 shows the meter electronics of the flow meter according to an embodiment of the invention.
Figure 3:
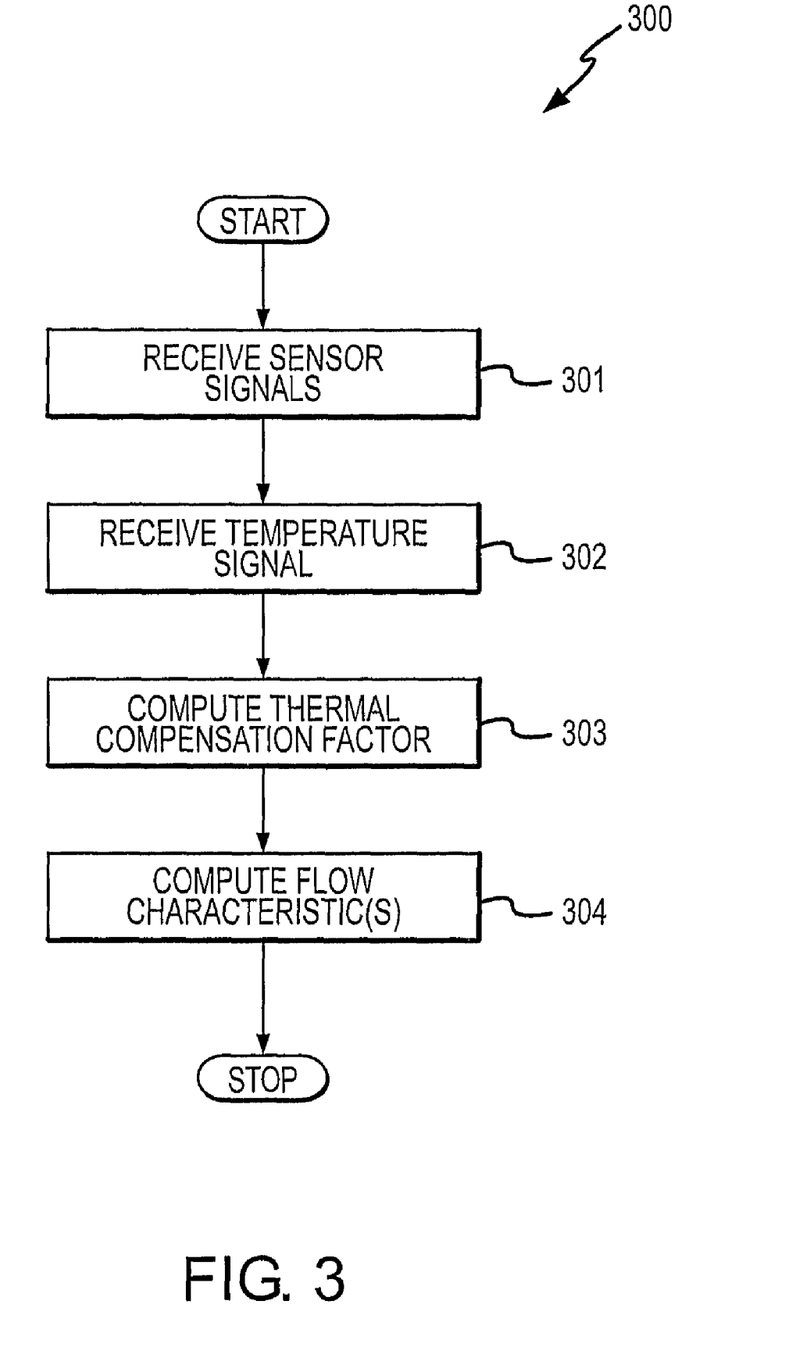
FIG. 3 is a flowchart of a method of operating a flow meter according to an embodiment of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates a Coriolis flow meter 5 comprising a flow meter assembly 10 and meter electronics 20. Meter electronics 20 is connected to meter assembly 10 via leads 100 to provide density, mass flow rate, volume flow rate, totalized mass flow, temperature, and other information over path 26. It should be apparent to those skilled in the art that the present invention can be used by any type of Coriolis flow meter 5 regardless of the number of drivers, pickoff sensors, flow conduits, or the operating mode of vibration. A Coriolis flow meter 5 structure is described although it is apparent to those skilled in the art that the present invention could be practiced as a vibrating tube densitometer without the additional measurement capability provided by a Coriolis flow meter 5.

Flow meter assembly 10 includes a pair of flanges 101 and 101', manifolds 150 and 150', driver 180, pickoff sensors 170L and 170R, and flow conduits 130 and 130'. Driver 180 and pickoff sensors 170L and 170R are connected to flow conduits 130 and 130'.

When flow meter assembly 10 is inserted into a pipeline system (not shown) which carries the material being measured, material enters flow meter assembly 10 through flange 101, passes through inlet manifold 150 where the total amount of material is directed to enter flow conduits 130 and 130', flows through flow conduits 130 and 130' and back into outlet manifold 150' where it exits meter assembly 10 through flange 101'.

Flow conduits 130 and 130' are selected and appropriately mounted to inlet manifold 150 and outlet manifold 150' so as to have substantially the same mass distribution, moments of inertia, and elastic modules about bending axes W-W and W'-W' respectively.

Flow conduits 130 and 130' are driven by driver 180 in opposite directions about their respective bending axes W and W' and at what is termed the first out of bending mode of the flow meter 5. Driver 180 may comprise one of many well known arrangements, such as a magnet mounted to flow conduit 130 and an opposing coil mounted to flow conduit 130'. An alternating current is passed through the opposing coil to cause both conduits to oscillate. A suitable drive signal is applied by meter electronics 20, via lead 186 to driver 180.

Meter electronics 20 receives sensor signals on leads 165L and 165R, respectively. Meter electronics 20 produces a drive signal on lead 185 which causes driver 180 to oscillate flow conduits 130 and 130'. Meter electronics 20 receives a temperature signal from a resistance temperature device (RTD) 190 that comprises an ambient temperature measurement. The temperature signal is received over lead 195 from the RTD 190. Meter electronics 20 processes left and right velocity signals from pickoff sensors 170L and 170R in order to compute a mass flow rate. Path 26 provides an input and an output means that allows meter electronics 20 to interface with an operator. The description of FIG. 1 is provided merely as an example of the operation of a flow meter 5 and is not intended to limit the teaching of the present invention.

FIG. 2 shows the meter electronics 20 of the flow meter 5 according to an embodiment of the invention. The meter electronics 20 includes an interface 23 and a processing system 24 and can further include a storage system 25.

The interface 23 is configured to receive signals from the flow meter assembly 10 and pass them on to the processing system 24. The interface 23 is configured to receive, for example, first and second sensor signals from the first and second pickoff sensors 170L and 170R. The interface 23 is further configured to receive and store a temperature signal 32 from the RTD 190. The temperature signal 32 comprises a measurement of the ambient temperature of the flow conduits 130 and 130'.

The processing system 24 receives and stores the first and second sensor signals 31 and the temperature signal 32. The processing system 24 further includes a linear coefficient of thermal expansion (a) 33. The linear coefficient of thermal expansion (a) 33 represents a change in geometric size due to temperature, or more properly, due to a change in temperature. Therefore, the linear coefficient of thermal expansion (a) 33 can comprise a linear function of temperature or can comprise a polynomial function of temperature. For purposes of the invention, the change in temperature can be a change in temperature (T) from a reference or calibration temperature ($T_0$), i.e., the value $T-T_0$.

The linear coefficient of thermal expansion ($\alpha$) 33 comprises a flow tube specific value. The linear coefficient of thermal expansion ($\alpha$) 33 is chosen according to at least the material of the flow tubes 130 and 130' of the flow meter assembly 10. In addition, the linear coefficient of thermal expansion (α) 33 can be chosen according to other properties of the flow meter assembly 10, such as a tube geometry, wall thickness, etc.

The linear coefficient of thermal expansion (α) 33 comprises a component of a geometric thermal compensation factor (TFe) 45. The geometric thermal compensation factor (TFe) 45 is used to perform geometric compensation due to thermal expansion/contraction of the flow meter assembly 10. The geometric thermal compensation factor (TFe) 45 can therefore be formed according to the materials and properties of the flow meter assembly 10. The geometric thermal compensation factor (TFe) 45 is discussed in greater detail below.

The processing system 24 is configured to compute one or more flow characteristics and one or more flow measurements from the sensor signals 31. The flow measurements can include one or more of a mass flow rate 35, a density 34, etc. The flow characteristics can include one or more of a frequency (f), a phase difference (Δθ), a time delay (Δt), etc., that are used to generate the flow measurements.

In one embodiment, the processing system 24 is configured to compute the geometric thermal compensation factor (TFe) 45 in one or more flow conduits 130 and 130' of the flow meter 5 using the temperature signal. The geometric thermal compensation factor (TFe) 45 is used to process the sensor signals 31.

In some embodiments, the geometric thermal compensation factor (TFe) 45 can comprise a linear compensation factor expressed as a $(1+\alpha \cdot \Delta T)$ term, for example. The linear representation of (TFe) can comprise a linear approximation of geometric thermal expansion. In some embodiments, a linear compensation factor (TFe) may provide sufficient accuracy. However, the geometric thermal expansion or contraction is not strictly linear and in some embodiments a linear approximation may not achieve the desired accuracy. Therefore, in some embodiments, the geometric thermal compensation factor (TFe) 45 can comprise a polynomial, as can be done for Young's modulus (E) (see equation (3)). The polynomial compensation factor can be expressed as a $(1+\alpha_1 \cdot \Delta T + \alpha_2 \cdot \Delta T^2 + \alpha_3 \cdot \Delta T^3)$ term, for example.

In one embodiment, the processing system 24 is configured to compute a geometric thermal compensation factor (TFe) 45 in one or more flow conduits 130 and 130' using the temperature signal and compute a thermally compensated density using the geometric thermal compensation factor (TFe) 45. In one embodiment, the processing system 24 is configured to compute a geometric thermal compensation factor (TFe) 45 in one or more flow conduits using the temperature signal and compute a thermally compensated mass flow rate using the geometric thermal compensation factor (TFe). Other flow characteristics can also be compensated with the geometric thermal compensation factor (TFe) 45.

The storage system 25 can store received signals and data. For example, the storage system 25 can store the received sensor signals 31 and the received temperature signal 32. The storage system 25 can store constants for use in computations. For example, the storage system 25 can store a reference temperature ($T_0$) 36, a stiffness value (K) 38, a first constant $C_1$ 39, a second constant $C_2$ 40, and a FCF value 37. The storage system 25 can store computed values, including the density 34, the mass flow rate 35, and the geometric thermal compensation factor (TFe) 45. Additional computed values can be stored in the storage system 25, as desired.

According to some embodiments of the invention, terms for thermal expansion and/or contraction are included in the density and mass flow equations for the flow meter, in addition to the compensation of the modulus of elasticity. Equations 6 through 14 below show the derivation of the geometric thermal compensation including the geometric thermal compensation factor (TFe) 45. Equations 15 and 19 show how the terms are included in processing the sensor signals of the flow meter 5.

The physical behavior of a Coriolis flow meter is well approximated by beam theory. The natural frequency of an Euler-Bernoulli beam is given in equation 6 below.

$$\omega_n = (\beta_n l)^2 \cdot \sqrt{\frac{E \cdot I}{(M/l) \cdot l^4}} \qquad (6)$$

The (E) term is the modulus of elasticity of the beam, the (I) term is the area moment of inertia of the beam, the (M/l) term is the mass per unit length of the beam (tube) and any fluid it contains, the (l) term is the length of the beam, and the $(\beta_n l)^2$ term is a constant that is dependent on the beam's boundary conditions.

The mass per unit length (M/l), written in terms of the density (ρ) and the cross-sectional area (A), is given in equation 7 below.

$$M/l = (\rho_t \cdot A_t + \rho_f \cdot A_f) \qquad (7)$$

The subscripts denote the flow conduit or tube (t) and the fluid (f).

The modulus of elasticity (E) may vary with temperature. Equation 8 below is an expression for the modulus of elasticity as a function of temperature. It is shown to be linear, but could be expressed by a higher order polynomial.

$$E(T) = E_0 \cdot (TF_y) \qquad (8)$$

The ($E_0$) term is the modulus of elasticity at the reference temperature ($T_0$). As previously discussed, the (TFy) term is Young's modulus, which can be represented as a linear approximation $(1-\phi \cdot (T-T_0))$ or as a polynomial $(1-\phi \cdot \Delta T - \phi_s \cdot \Delta T^2 - \phi_3 - \phi_4 \cdot \Delta T^4)$.

The dimensions of the tube may vary with temperature due to thermal expansion. Equation 9 below is an expression for the tube length (l) as a function of temperature. It is shown to be linear, but like the modulus of elasticity, could be expressed by a higher order polynomial.

$$l(T) = l_0 \cdot (TF_e) \qquad (9)$$

The $l_0$ term is the length at the reference temperature $T_0$ and the (TFe) term is the geometric thermal expansion factor. Again, the (TFe) term comprises the geometric thermal expansion factor including the $(T-T_0$ or $\Delta T)$ term and the (α) term. The α term may comprise a linear coefficient of thermal expansion that is introduced according to the invention. The a term is introduced in order to provide thermal compensation for geometric expansion/contraction.

This relationship is applicable to the other dimensions, such as the internal and external diameters. The internal and external diameters are used to calculate the tube cross-sectional area $A_t(T)$, the fluid cross-sectional area $A_f(T)$, and the area moment of inertia I(T), shown in equations 10-12 below.

$$A_t(T) = \frac{\pi}{4} \cdot (d_o^2 - d_i^2) \cdot (TF_e)^2 \qquad (10)$$

The $d_o$ term is the tube's external diameter and the $d_i$ term is the internal diameter.

$$A_f(T) = \frac{\pi}{4} \cdot d_i^2 \cdot (TF_e)^2 \quad (11)$$

$$I(T) = \frac{\pi}{64} \cdot (d_o^4 - d_i^4) \cdot (TF_e)^4 \quad (12)$$

The mass of a tube does not change with temperature, so its density must decrease with any volumetric expansion. The tube's density ($\rho_t$) as a function of temperature is given in equation 13 below.

$$\rho_t(T) = \frac{\rho_{t0}}{(TF_e)^3} \quad (13)$$

The $\rho_{t0}$ term is the density of the flow conduit at the reference temperature ($T_0$).

The tube period (K) is inversely proportional to the natural frequency ($\omega_n$), as given in equation 14 below.

$$K = \frac{2\pi}{\omega_n} \quad (14)$$

Using equations 6-14, the fluid density ($\rho_f$) can be written in terms of the tube period (K), temperature (T), the change in modulus with temperature ($\phi$), and the geometric thermal compensation factor (TFe), as in given in equation 15 below.

$$\rho_f = \frac{K^2 \cdot C_1 \cdot (TF_y)}{(TF_e)^2} - \frac{C_2}{(TF_e)^3} \quad (15)$$

The $C_1$ and $C_2$ terms are constants that are independent of temperature and that are related to the flow tube's geometry and material properties at the reference temperature. The (TFy) and (TFe) terms include ($\Delta T$) terms that comprise the difference between the temperature (T) and the reference temperature ($T_0$). In addition, the (TFe) term includes the linear coefficient of thermal expansion ($\alpha$).

The phase angle difference ($\Delta\theta$) between two points on a fluid conveying beam, due to Coriolis forces, is of the form given in equation 16 below.

$$\Delta\theta(x) = \dot{m} \cdot \sqrt{\frac{1}{E \cdot I \cdot (M/l)}} \cdot f(\Delta x) \quad (16)$$

The x term represents the position along the length of the beam and can be given in terms of length (l), the ($\dot{m}$) term is the mass flow rate, and the other variables are as previously defined.

The time delay ($\Delta t$) is related to the phase difference ($\Delta\theta$) as given in equation 17 below.

$$\Delta t = \frac{\Delta\theta(x)}{\omega_n} \quad (17)$$

From equations 6 and 16, the time delay ($\Delta t$) can be written in terms of mass flow rate ($\dot{m}$) and a constant (C), as given in equation 18 below.

$$\Delta t = \frac{\dot{m} \cdot C}{\left(\frac{E \cdot I}{l^3}\right)} \quad (18)$$

The C term is a constant based on the two points where the time delay ($\Delta t$) is measured.

The mass flow rate ($\dot{m}$) can be written in terms of the time delay ($\Delta t$), the temperature (T), the change in modulus with temperature ($\phi$), and the geometric thermal compensation factor (TFe), as in given in equation 19 below.

$$\dot{m} = FCF \cdot \Delta t \cdot (TF_y) \cdot (TF_e) \quad (19)$$

The FCF term comprises a substantially constant value that is independent of temperature and that is related to the flow tube's geometry and material properties at the reference temperature ($T_0$). The ($\Delta T$) value is the difference between the temperature (T) and the reference temperature ($T_0$).

The mass flow error introduced by not properly accounting for the geometric thermal expansion/contraction is not large, provided that all other variables are properly characterized and that the temperature measurement is accurate. However, in contrast, the density error can be appreciable if the geometric thermal changes are not taken into consideration. The inaccuracy for both the mass flow rate and the density becomes more pronounced as the ambient temperature moves away from the reference temperature.

The new method of calculating mass flow and density improves the accuracy of Coriolis flow meters and vibrating densitometers by accounting for thermal expansion/contraction. The benefits for the density measurement accuracy are significant when the density of the flow fluid is different than the density of water and the temperature is not near the calibration temperature ($T_0$).

FIG. 3 is a flowchart 300 of a method of operating a flow meter 5 according to an embodiment of the invention. In step 301, the sensor signals 31 are received. In some embodiments, first and second sensor signals 31 are received from the flow meter.

In step 302, the meter electronics receives the temperature signal from the flow meter assembly 10. The temperature comprises a substantially ambient temperature.

In step 303, the meter electronics computes the geometric thermal compensation factor (TFe), as previously discussed. The geometric thermal compensation factor can compensate flow characteristics for thermal expansion or contraction in the flow conduit geometry. The thermal expansion or contraction can include, for example, changes in cross-sectional size and/or changes in length of the flow conduit or conduits.

In step 304, one or more flow characteristics are computed using the geometric thermal compensation factor (TFe). A compensated density value for the flow fluid can be computed, as previously discussed. A compensated mass flow rate value for the flow fluid can be computed, as previously discussed.

The thermal compensation provides an increased accuracy. The thermal compensation provides an improved accuracy over substantially the entire operating temperature range of the flow meter.

The thermal compensation provides a more accurate compensation for mass flow measurement. The thermal compensation provides a more accurate compensation for density.

The thermal compensation improves the analysis of test results when the temperature varies between tests.

What is claimed is:

1. Meter electronics for geometric thermal compensation in a vibratory flow meter, with the meter electronics including:
    an interface configured to receive one or more vibrational sensor signals and a temperature signal (T) of the vibratory flow meter; and
    a processing system coupled with the interface and configured to receive the one or more vibrational sensor signals and the temperature signal and compute a geometric thermal compensation factor (TFe) for one or more flow conduits of the vibratory flow meter using the temperature signal (T), wherein the geometric thermal compensation factor (TFe) is used to process the one or more vibrational sensor signals.

2. The meter electronics of claim 1, with the geometric thermal compensation factor (TFe) comprising a linear expression.

3. The meter electronics of claim 1, with the geometric thermal compensation factor (TFe) comprising a polynomial expression.

4. The meter electronics of claim 1, with the meter electronics further comprising a storage system configured to store the geometric thermal compensation factor (TFe).

5. The meter electronics of claim 1, with the meter electronics further comprising a storage system configured to store a density and a mass flow rate.

6. The meter electronics of claim 1, with the processing system being configured to compute the geometric thermal compensation factor (TFe) for the one or more flow conduits using the temperature signal (T) and a linear coefficient of thermal expansion ($\alpha$).

7. The meter electronics of claim 1, wherein the geometric thermal compensation factor (TFe) includes a temperature difference ($\Delta T$) between a reference temperature ($T_0$) and the temperature signal (T).

8. The meter electronics of claim 1, with the processing system being configured to compute one or more flow characteristics from the one or more vibrational sensor signals and the geometric thermal compensation factor (TFe).

9. The meter electronics of claim 1, with the processing system being configured to compute a thermally compensated density.

10. The meter electronics of claim 1, with the processing system being configured to compute a thermally compensated density according to the equation $$\rho_f = \frac{K^2 \cdot C_1 \cdot (TF_y)}{(TF_e)^2} - \frac{C_2}{(TF_e)^3},$$

with the (TFe) term including a linear coefficient of thermal expansion ($\alpha$) where K is a tube period and $C_1$ and $C_2$ are calibration constants.

11. The meter electronics of claim 10, where the (TFy) term comprises a modulus of elasticity thermal compensation term.

12. The meter electronics of claim 1, with the processing system being configured to compute a thermally compensated mass flow rate.

13. The meter electronics of claim 1, with the processing system being configured to compute a thermally compensated mass flow rate according to the equation $\dot{m}=FCF \cdot \Delta T \cdot (TF_y) \cdot (TF_e)$, with the (TFe) term including a linear coefficient of thermal expansion ($\alpha$), where FCF is a flow calibration factor and $\Delta T$ is a temperature difference.

14. The meter electronics of claim 13, where the (TFy) term comprises a modulus of elasticity thermal compensation term.

15. A method for geometric thermal compensation in a vibratory flow meter, the method including:
    receiving one or more vibrational sensor signals and a temperature signal (T) of the vibratory flow meter; and
    computing a geometric thermal compensation factor (TFe) for one or more flow conduits of the vibratory flow meter using the temperature signal (T), wherein the geometric thermal compensation factor (TFe) is used to process the one or more vibrational sensor signals.

16. The method of claim 15, with the geometric thermal compensation factor (TFe) comprising a linear expression.

17. The method of claim 15, with the geometric thermal compensation factor (TFe) comprising a polynomial expression.

18. The method of claim 15, with the computing further comprising computing the geometric thermal compensation factor (TFe) for the one or more flow conduits using the temperature signal (T) and a linear coefficient of thermal expansion ($\alpha$).

19. The method of claim 15, wherein the geometric thermal compensation factor (TFe) includes a temperature difference ($\Delta T$) between a reference temperature ($T_0$) and the temperature signal (T).

20. The method of claim 15, further comprising computing one or more flow characteristics from the one or more vibrational sensor signals and the geometric thermal compensation factor (TFe).

21. The method of claim 15, further comprising computing a thermally compensated density.

22. The method of claim 15, further comprising computing a thermally compensated density according to the equation $$\rho_f = \frac{K^2 \cdot C_1 \cdot (TF_y)}{(TF_e)^2} - \frac{C_2}{(TF_e)^3},$$

with the (TFe) term including a linear coefficient of thermal expansion ($\alpha$) where K is a tube period and $C_1$ and $C_2$ are calibration constants.

23. The method of claim 22, where the (TFy) term comprises a modulus of elasticity thermal compensation term.

24. The method of claim 15, further comprising computing a thermally compensated mass flow rate.

25. The method of claim 15, further comprising computing a thermally compensated mass flow rate according to the equation $\dot{m}=FCF \cdot \Delta T \cdot (TF_y) \cdot (TF_e)$, with the (TFe) term including a linear coefficient of thermal expansion ($\alpha$), where FCF is a flow calibration factor and $\Delta T$ is a temperature difference.

26. The method of claim 25, where the (TFy) includes a modulus of elasticity thermal compensation term.

27. A method for geometric thermal compensation in a vibratory flow meter, the method including:
    receiving one or more vibrational sensor signals and a temperature signal (T) of the vibratory flow meter;

computing a geometric thermal compensation factor (TFe) for one or more flow conduits of the vibratory flow meter using the temperature signal (T); and computing one or both of a thermally compensated density or a thermally compensated mass flow rate, wherein the geometric thermal compensation factor (TFe) is used to process the one or more vibrational sensor signals.

28. The method of claim 27, with the geometric thermal compensation factor (TFe) comprising a linear expression.

29. The method of claim 27, with the geometric thermal compensation factor (TFe) comprising a polynomial expression.

30. The method of claim 27, with computing the geometric thermal compensation factor (TFe) further comprising computing the geometric thermal compensation factor (TFe) for the one or more flow conduits using the temperature signal (T) and a linear coefficient of thermal expansion ($\alpha$).

31. The method of claim 27, wherein the geometric thermal compensation factor (TFe) includes a temperature difference ($\Delta T$) between a reference temperature ($T_0$) and the temperature signal (T).

32. The method of claim 27, with computing the thermally compensated density further comprising computing the thermally compensated density according to the equation $$\rho_f = \frac{K^2 \cdot C_1 \cdot (TF_y)}{(TF_e)^2} - \frac{C_2}{(TF_e)^3},$$

with the (TFe) term including a linear coefficient of thermal expansion ($\alpha$), where K is a tube period and $C_1$ and $C_2$ are calibration constants.

33. The method of claim 32, where the (TFy) term comprises a modulus of elasticity thermal compensation term.

34. The method of claim 27, with computing the thermally compensated mass flow rate further comprising computing the thermally compensated mass flow rate according to the equation $\dot{m}=FCF \cdot \Delta T \cdot (TF_y) \cdot (TF_y)$, with the (TFe) term including a linear coefficient of thermal expansion ($\alpha$), where FCF is a flow calibration factor and $\Delta T$ is a temperature difference.

35. The method of claim 34, where the (TFy) term comprises a modulus of elasticity thermal compensation term.

* * * * *

UNITED STATES PATENT AND TRADEMARK OFFICE
CERTIFICATE OF CORRECTION

PATENT NO. : 8,229,695 B2
APPLICATION NO. : 12/441118
DATED : July 24, 2012
INVENTOR(S) : Aart R Pruysen et al.

It is certified that error appears in the above-identified patent and that said Letters Patent is hereby corrected as shown below:

Column 2, Line 37 replace the equation with $$\dot{m} = FCF \cdot (1 - \phi_1 \cdot \Delta T - \phi_2 \cdot \Delta T^2 - \phi_3 \cdot \Delta T^3 - \phi_4 \cdot \Delta T^4) \cdot (\Delta t - zero)$$

Column 5, Line 21 replace the equation with $$\dot{m} = FCF \cdot \Delta T \cdot (TF_y) \cdot (TF_e)$$

Column 8, Line 25 replace the equation with $$M/l = (\rho_t \cdot A_t + \rho_f \cdot A_f)$$

Signed and Sealed this
Nineteenth Day of February, 2013

Teresa Stanek Rea
*Acting Director of the United States Patent and Trademark Office*